(12) United States Patent  (10) Patent No.: US 8,993,477 B2
Milanov et al.  (45) Date of Patent: Mar. 31, 2015

(54) CATALYST COMPOSITION FOR THE STEAM REFORMING OF METHANE IN FUEL CELLS

(71) Applicant: BASF SE, Ludwigshafen (DE)

(72) Inventors: Andrian Milanov, Mannheim (DE);
Ekkehard Schwab, Neustadt (DE);
Alexander Schäfer, Limburgerhof (DE)

(73) Assignee: BASF SE (DE)

( * ) Notice: Subject to any disclaimer, the term of this patent is extended or adjusted under 35 U.S.C. 154(b) by 104 days.

(21) Appl. No.: 13/670,967

(22) Filed: Nov. 7, 2012

(65) Prior Publication Data

US 2013/0116118 A1   May 9, 2013

Related U.S. Application Data

(60) Provisional application No. 61/557,447, filed on Nov. 9, 2011.

(51) Int. Cl.
*B01J 23/00* (2006.01)
*H01M 8/06* (2006.01)
*B01J 23/755* (2006.01)
(Continued)

(52) U.S. Cl.
CPC ............ *H01M 8/0637* (2013.01); *B01J 23/755* (2013.01); *C01B 3/38* (2013.01); *B01J 23/78* (2013.01); *B01J 35/023* (2013.01); *B01J 35/1014* (2013.01); *B01J 35/1019* (2013.01); *B01J 37/0009* (2013.01); *B01J 37/03* (2013.01); *B01J 37/04* (2013.01); *B01J 35/0006* (2013.01); *B01J 37/0036* (2013.01); *H01M 2008/147* (2013.01); *C01B 2203/0233* (2013.01); *C01B 2203/067* (2013.01); *C01B 2203/1058* (2013.01);
(Continued)

(58) Field of Classification Search
CPC ...... B01J 23/755; B01J 23/83; B01J 35/1019; C01B 3/40; C01B 2203/1052
USPC ......................................................... 502/335
See application file for complete search history.

(56) References Cited

U.S. PATENT DOCUMENTS

2004/0166056 A1  8/2004 Eyman et al.
2011/0003681 A1  1/2011 Speyer et al.

FOREIGN PATENT DOCUMENTS

CN    101402041 A    4/2009
CN    101829577 A    9/2010
(Continued)

OTHER PUBLICATIONS

M. R. Karim, M. A. Rahman, M. A. J. Miah. H. Ahmadl, M. Yanagisawa, M. Ito "Synthesis of γ-Alumina Particles and Surface Characterization", The Open Colloid Science Journal, 2011, 4, 32-36.*

(Continued)

*Primary Examiner* — Colleen Dunn
*Assistant Examiner* — Haytham Soliman
(74) *Attorney, Agent, or Firm* — Drinker Biddle & Reath LLP

(57) ABSTRACT

The present invention relates to a catalyst composition and a catalyst material produced therefrom for the steam reforming of methane in fuel cells, in particular for the direct internal reforming of methane in molten carbonate fuel cells. The invention further relates to a process for producing such catalyst compositions.

10 Claims, 1 Drawing Sheet

(51) Int. Cl.
  *C01B 3/38* (2006.01)
  *B01J 23/78* (2006.01)
  *B01J 35/02* (2006.01)
  *B01J 35/10* (2006.01)
  *B01J 37/00* (2006.01)
  *B01J 37/03* (2006.01)
  *B01J 37/04* (2006.01)
  *B01J 35/00* (2006.01)
  *H01M 8/14* (2006.01)

(52) U.S. Cl.
  CPC ......... *C01B 2203/1241* (2013.01); *Y02E 60/50* (2013.01); *Y02E 60/526* (2013.01)
  USPC .......................................................... 502/335

(56) References Cited

FOREIGN PATENT DOCUMENTS

| | | |
|---|---|---|
| DE | 10156033 | 6/2003 |
| DE | 102007009556 A1 | 10/2008 |
| EP | 2 2362 04 A1 | 10/2010 |

OTHER PUBLICATIONS

International Search Report for PCT/IB2012/056155 dated Mar. 14, 2013.
Bridger et al., "The Stream Reforming of Hydrocarbons", The Chemical Society, Specialist Periodical Reports 3, (1980), pp. 39-69.
U.S. Appl. No. 13/670,815.
U.S. Appl. No. 13/671,159.

* cited by examiner

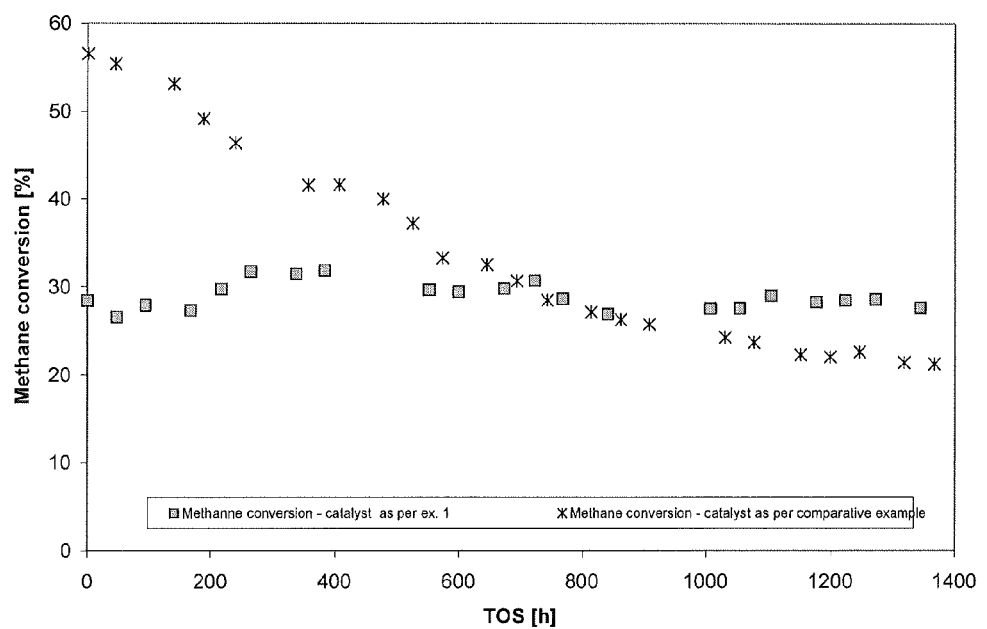

CATALYST COMPOSITION FOR THE STEAM REFORMING OF METHANE IN FUEL CELLS

CROSS-REFERENCE TO RELATED APPLICATIONS

This application claims the benefit of U.S. Provisional Application 61/557,447, filed Nov. 9, 2011, which is incorporated herein by reference.

The present invention relates to a catalyst composition and a catalyst material produced therefrom for the steam reforming of methane in fuel cells, in particular in molten carbonate fuel cells. The invention further relates to a process for producing such catalyst compositions.

Molten carbonate fuel cells ("MCFCs") are high-temperature fuel cells in which electric power is generated by means of electrochemical reactions between cathode and anode and an electrolyte matrix located in between. In this type of cell, a molten eutectic of an alkali metal carbonate mixed melt (e.g. composed of lithium carbonate and potassium carbonate) with which a support material (e.g. a support membrane composed of $LiAlO_2/Al_2O_3$) is impregnated is used as electrolyte.

The hydrogen required for operation of the fuel cell can be produced directly in the cell by a steam reforming reaction. A steam reforming reaction of methane may be mentioned by way of example:

$$CH_4 + H_2O \rightarrow CO + 3H_2 \tag{1}$$

$$CO + H_2O \rightarrow CO_2 + H_2 \tag{2}$$

The first reaction is strongly endothermic and can directly consume the heat liberated by the electrochemical reaction. This reaction is a catalytic reaction which requires a reforming catalyst (e.g. an Ni catalyst), and it is possible to utilize natural gas (optionally also methane, petroleum gas, naphtha, heavy oil or crude oil) as starting material for operation of the fuel cell.

Further information on steam reforming of methane may be found in numerous literature references (see, for example, "Catalytic Steam Reforming" in "Catalysis" Science and Technology, Vol. 5, Springer Verlag, Berlin, 1985 or "Catalysis" Vol. 3, Specialist Periodical Reports, London 1980, The Chemical Society). Commercial nickel catalysts for the steam reforming of methane are described, for example, in Catalysis Science and Technology, J. R. Andersen and M. Boudart, Vol. 5, Springer-Verlag, Berlin 1984.

Part of the reforming is nowadays usually carried out in a preformer. This is advantageous since hydrogen should be available immediately on entry into the cell. However, a further part of the reforming should take place in the cell. The process is also known as direct internal reforming (DIR). Here, it is advantageous for the endothermic reforming to take place in the direct vicinity of the electrochemical reaction, firstly because of the available heat exchange and secondly because of the shift in the chemical equilibrium.

During operation of molten carbonate fuel cells at temperatures in the range from 580° C. to 675° C., vaporization of part of the electrolyte in the form of alkali metal compounds such as KOH, NaOH or LiOH is observed. These alkali metal ions can deposit on the reforming catalysts mentioned at the outset and deactivate these by undesirable poisoning.

As a solution to the problem, DE 10165033 A1 proposes the use of a potassium adsorption material on a support (e.g. paper) between anode and catalyst. This can, firstly, quickly lead to saturation of the adsorption material and, secondly, the potassium is irreversibly removed from the electrolyte and a shift in the equilibrium in the direction of renewed formation of KOH occurs. In addition, effective K adsorption can only be ensured in the case of a very fine-pored layer which has a high pressure drop or a low gas exchange between the layer comprising the catalyst and the porous current collector layer.

In DE 102007009556 A1, a catalyst having a high pore volume of at least 200 $mm^3/g$ for the steam reforming of methane is proposed in order to solve the problem. Although these catalysts have a reduced sensitivity to potassium ions, the deactivation behavior of this type of catalyst continues to be unsatisfactory.

It is thus an object of the present invention to provide a system for direct internal reforming in an MCFC, by means of which catalyst poisoning by alkali metals (e.g. potassium ions and/or lithium ions) is effectively prevented and the above-mentioned problems can be alleviated. For this purpose, a catalyst which has a low deactivation rate and at the same time a high stability toward alkali metal ions should be provided.

This object was achieved by a catalyst composition for the steam reforming of methane, in particular for direct internal reforming in a molten carbonate fuel cell, which comprises as component a) a nickel catalyst comprising mixed oxides of nickel and at least one further element selected from the group consisting of aluminum, magnesium, silicon and zirconium and as component b) a further oxygen-comprising aluminum compound selected from the group consisting of aluminum hydroxide $[Al(OH)_3]$, aluminum oxide hydroxide $[AlO(OH)]$ and aluminum oxide $(Al_2O_3)$, wherein the catalyst composition is a physical mixture of the components a) and b).

In the context of the catalyst composition of the invention, the term "physical mixture" refers to a heterogeneous mixture in which the components a) and b) are present in clearly separate phases and thus form a multiphase system.

To obtain such a physical mixture, the components a) and b) are, preferably as pulverulent particles, combined and intimately mixed, as described below. Mixing can be carried out in any known mixer, for example in a drum hoop mixer, powder mixer, tumble mixer or in other mixers suitable for the purpose.

The catalytic active phase of the catalyst composition of the invention (component a) can comprise, for example, nickel, aluminum and zirconium or nickel, magnesium and silicon, but is not restricted to these elements/mixtures. The highly active nickel-comprising catalysts, in particular precipitated preforming, reforming and hydrogenation catalysts, which are already known from the prior art are preferred. Examples which may be mentioned are prereforming and reforming catalysts from BASF SE, including the catalysts G1-80 comprising from 60 to 70% by weight of NiO and additionally $SiO_2$, MgO and $Cr_2O_3$ and G1-85 comprising from 60 to 75% by weight of NiO and additionally $Al_2O_3$ and $ZrO_2$.

The component b) can comprise aluminum hydroxide $[Al(OH)_3]$, aluminum oxide hydroxide $[AlO(OH)]$ or aluminum oxide $(Al_2O_3)$ or mixtures thereof. The term aluminum hydroxide refers to gibbsite $[\gamma$-$Al(OH)_3]$, bayerite $[\alpha$-$Al(OH)_3]$ or amorphous hydroxides from sol-gel processes. In the case of aluminum oxide hydroxide, preference is given to using boehmite $[\gamma$-$AlO(OH)]$. In a preferred embodiment, aluminum oxide phases having a high surface area, for example chi-aluminum oxide $(\chi$-$Al_2O_3)$, eta-aluminum oxide $(\eta$-$Al_2O_3)$, rho-aluminum oxide $(\rho$-$Al_2O_3)$, kappa-aluminum oxide $(\kappa$-$Al_2O_3)$, gamma-aluminum oxide $(\gamma$-$Al_2O_3)$, delta-aluminum oxide $(\delta$-$Al_2O_3)$, or theta-aluminum oxide $(\theta$-$Al_2O_3)$ are used as component b). The aluminum oxide phase particularly preferably comprises $\gamma$-$Al_2O_3$, $\delta$-$Al_2O_3$ or θ-$Al_2O_3$ or a mixture of these three phases. The phase composition of the component b) can be determined, for example, by X-ray diffraction.

A preferred embodiment of the catalyst composition of the invention comprises mixed oxides of nickel, aluminum and zirconium as component a) and gamma-aluminum oxide (γ-$Al_2O_3$), delta-aluminum oxide (δ-$Al_2O_3$) or theta-aluminum oxide (θ-$Al_2O_3$) or mixtures thereof as component b).

The amount of component b) in the catalyst composition is in the range from 1 to 60% by weight, preferably in the range from 5 to 50% by weight and particularly preferably in the range from 10 to 30% by weight, based on the total weight of the catalyst composition.

Furthermore, in the catalyst composition of the invention, the particles of the component a) have a particle size having a $d_{50}$ of from 0.5 to 1500 μm, preferably from 1 to 1000 μm, particularly preferably from 1 to 500 μm, very particularly preferably from 50 to 300 μm, and the particles of the component b) have a particle sizes having a $d_{50}$ of from 0.3 to 500 μm, preferably from 0.5 to 250 μm, particularly preferably from 1 to 200 μm, very particularly preferably from 10 to 150 μm.

The $d_{50}$ means that 50% of the particles have this value (particle diameter). The determination of the particle size and the particle size distribution of the catalyst is carried out by laser light scattering using a Malvern Mastersizer 2000 having a measuring range of 0.02-2000 μm. Evaluation is carried out by the Fraunhofer method.

In addition, in the catalyst composition of the invention, the BET surface area of the component a) is in the range from 20 to 300 $m^2/g$, preferably in the range from 30 to 250 $m^2/g$, particularly preferably in the range from 50 to 200 $m^2/g$, and the component b) has a BET surface area in the range from 20 to 400 $m^2/g$, preferably in the range from 30 to 300 $m^2/g$, particularly preferably in the range from 50 to 200 $m^2/g$.

The determination of the BET surface area is carried out in accordance with DIN 66131. Evaluation is carried out by the multipoint method using 5 measuring points. Drying immediately before the measurement is carried out at 200° C. The pressure range $p/p_0$=0.065-0.208 is measured.

The invention also provides a catalyst material comprising a catalyst composition which has been processed to form pellets or extrudates and comprises as component a) a nickel catalyst comprising mixed oxides of nickel and at least one further element selected from the group consisting of aluminum, magnesium, silicon and zirconium and as component b) a further oxygen-comprising aluminum compound selected from the group consisting of aluminum hydroxide [Al(OH)$_3$], aluminum oxide hydroxide [AlO(OH)] and aluminum oxide ($Al_2O_3$), wherein the catalyst composition is a physical mixture of the components a) and b).

A preferred embodiment of the catalyst material of the invention is present in the form of pellets which comprise, apart from binders, lubricants and other processing aids, essentially mixed oxides of nickel, aluminum and zirconium as component a) and gamma-aluminum oxide (γ-$Al_2O_3$), delta-aluminum oxide (δ-$Al_2O_3$) or theta-aluminum oxide (θ-$Al_2O_3$) or mixtures thereof as component b).

In a molten carbonate fuel cell, use is made of pellets which have a diameter in the range from 0.8 to 5 mm, preferably in the range from 1 to 3 mm, particularly preferably in the range from 1.5 to 2.5 mm, and whose height is in the range from 1 to 10 mm, preferably in the range from 1 to 5 mm, particularly preferably in the range from 1.5 to 4 mm.

As regards further preferred embodiments of the catalyst material of the invention, in particular in respect of the components a) and b), reference may be made to what has been said above in respect of the catalyst composition of the invention.

The invention also provides a process for producing the catalyst composition defined above, which comprises the following process steps in the order indicated:
  a) production of a solution or dispersion of the component a) and/or soluble starting compounds for this;
  b) precipitation of a solid from this solution or dispersion by addition of a base;
  c) isolation and drying of the solid;
  d) optionally calcination of the solid;
  e) optionally compaction of the solid;
  f) milling of the solid to a uniform particle size and
  g) homogeneous mixing of the solid with the component b).

In the first process step, step a), a solution or dispersion of the component a) is usually produced, for example by dissolution or dispersion in an acid such as nitric acid. It is optionally possible to use starting compounds for the component a) instead of the component itself, for example the nitrates, carbonates, hydroxycarbonates of the metals are dissolved in an aqueous solution which can also be acidic, for example comprise nitric acid. The ratio of the salts in the solution or dispersion is stoichiometrically calculated and set according to the desired final composition of the catalyst composition.

In step b), a solid is precipitated as precursor of the catalyst composition from this solution or dispersion. This is carried out in a conventional way, preferably by increasing the pH of the solution or dispersion by addition of a base, for instance by addition of sodium hydroxide solution or sodium carbonate solution.

The solid precipitation product formed is generally separated off from the supernatant solution, for instance by filtration or decantation, and washed with water until it is free of soluble constituents such as sodium nitrate before drying in step c). The precipitation product is then normally dried by conventional drying methods before further processing. In general, treatment at slightly elevated temperature, for instance at least 80° C., preferably at least 100° C. and particularly preferably at least 120° C., for a period of from 10 minutes to 12 hours, preferably from 20 minutes to 6 hours and particularly preferably from 30 minutes to 2 hours, is sufficient for this purpose. It is also possible and particularly convenient to spray dry the product of the precipitation, either directly or after washing, to convert it into a dry powder which can be processed further.

After drying, the precipitated and dried intermediate of the catalyst composition can optionally be subjected to a calcination step d). The calcination temperature employed is generally at least 250° C., preferably at least 300° C. and particularly preferably at least 350° C., and also generally not more than 500° C., preferably not more than 450° C. and particularly preferably not more than 410° C. The calcination time is generally at least 10 minutes, preferably at least 20 minutes and particularly preferably at least 30 minutes, and also generally not more than 12 hours, preferably not more than 6 hours and particularly preferably not more than 4 hours. The drying step c) and the calcination step d) can go over directly into one another.

After the drying step c) or the calcination step d), the intermediate for the catalyst composition can be subjected to a compacting step e). This can be carried out, for example, in a roller compactor.

During the course of the production process, the component a) of the catalyst composition is subjected to at least one of the two process steps d) or e), optionally both. In the calcination step, the BET surface area and the pore volume, inter alia, are also set in the usual way; as is known, the BET surface and the pore volume decrease with increasing calcination time and calcination temperature.

The calcination is preferably carried out at least until the carbonate content (calculated as $CO_3^{2-}$) is not more than 10% by weight, based on the total weight of the calcination product, and the BET surface area thereof is in the range from at least 20 to not more than 300 m$^2$/g.

The milling of the solid of the component a) in process step f) can be carried out in any mill, for example a hammer mill, and the isolation of the particles having the desired particle size can be carried out by using a cyclone. Other methods for separating off the catalyst particles having the appropriate size are conceivable, for example centrifugation or sedimentation.

In the milling step, the solid of component a) is milled to a uniform particle size which generally has a $d_{50}$ of from 0.5 to 1500 μm, preferably from 1 to 1000 μm, particularly preferably from 1 to 500 μm, very particularly preferably from 50 to 300 μm.

In the last step of the production of the catalyst composition of the invention, the components a) and b) are combined and intimately mixed. Mixing can be carried out in any known mixture, for example in a drum hoop mixer, powder mixer, tumble mixer or other mixers suitable for the purpose.

Further additives such as binders, lubricants and other processing aids can also be added to the mixture; these can be added before, after or simultaneously with the components a) and b). Lubricants, for example graphite, stearic acid, magnesium stearate or other lubricants known in the prior art, serve to aid the shaping of the catalyst composition of the invention to a suitable form.

The invention further provides a process for producing the catalyst material defined above by tableting or extrusion of a powder or of granules of the catalyst composition which has been comprehensively described above, with the following steps, inter alia, being conceivable:

precompaction and tableting of the pretreated powder to form pellets, mixing with liquid, kneading/pan milling and extruding to form rod-like extrudates.

A preferred embodiment of the process is tableting of the pretreated powder to form pellets in eccentric or rotary presses.

The catalyst material and the catalyst composition are particularly suitable for use as reforming catalyst in a fuel cell, in particular for the direct internal reforming of methane in molten carbonate fuel cells.

The invention is illustrated below by means of examples.

EXAMPLE 1

Production of the Catalyst Material of the Invention 420 g of a calcined powder comprising a homogeneous mixture of the oxides of nickel, aluminum and zirconium (BET surface area=160 m$^2$/g; NiO=72% by weight, $Al_2O_3$=19% by weight, $ZrO_2$=9% by weight, $d_{50}$=137 μm) were used as reforming-active phase (component a). 180 g of an aluminum oxide powder comprising γ-$Al_2O_3$, δ-$Al_2O_3$ and θ-$Al_2O_3$ (BET=126 m$^2$/g, $d_{50}$=116 μm; from Sasol Germany GmbH) were added as component b). The powder mixture was subsequently admixed with 3% by weight of graphite and intimately mixed by means of a drum hoop mixer (from J. Engelsmann AG). The mixture obtained in this way was compacted on a compactor and subsequently processed on a hydraulic eccentric press (Kilian SP300, Kilian & Co GmbH) to give solid pellets (diameter=2.5 mm; height=2.5 mm) (overall composition of the catalyst based on oxides: 50.4% by weight of NiO, 43.65% by weight of $Al_2O_3$, 5.95% by weight of $ZrO_2$).

Comparative Example

The comparative catalyst was produced using 500 g of the same calcined powder comprising the oxides of nickel, aluminum and zirconium (BET surface area=160 m$^2$/g; NiO=72% by weight, $Al_2O_3$=19% by weight, $ZrO_2$=9% by weight). The powder was admixed with 3% by weight of graphite and intimately mixed by means of a drum hoop mixer (from J. Engelsmann AG). The mixture obtained in this way was compacted on a compactor and subsequently processed on a hydraulic eccentric press (Kilian SP300, Kilian & Co GmbH) to form solid pellets (diameter=2.5 mm; height=2.5 mm).

Catalyst Tests

Testing of the reforming activity of the catalysts was carried out using a vertical reactor having an isothermal heating zone of about 50 cm. The catalyst to be tested was installed on one side of the reactor in the isothermal zone, heated to 600° C. under nitrogen and subsequently reduced by means of hydrogen for 15 hours (overnight). The reactor temperature was then increased to 700° C. and reforming was carried out for 2.5 hours using the following gas mixture (% by volume): 18% of $CH_4$, 7% of $H_2$, 2% of $CO_2$, 73% of $H_2O$, at a space velocity of 60000 h$^{-1}$. The methane conversion determined in this way was used as starting point in the study of the deactivation behavior of the catalyst due to alkali metal hydroxide vapor.

For this study, the reactor was cooled to room temperature and charged under inert gas ($N_2$) from the side opposite the catalyst with $LiAlO_2$/α$Al_2O_3$ pellets (20×5 mm) which had been impregnated with a mixture of $Li_2CO_3$ and $K_2CO_3$ (molar ratio 62:38; 25% by weight of Li/K—$CO_3$). The rector was subsequently heated and the deactivation test was commenced. The methane conversion was metered at regular intervals during the entire duration of the test (~1400 h).

The results of the activity measurements are shown in FIG. 1. It can clearly be seen that the catalyst of the invention has a very stable methane conversion activity remaining virtually unchanged over the entire duration of the test. In contrast, the comparative catalyst displays a high initial methane conversion but this decreases continually as a result of the presence of alkali metal hydroxide or alkali metal carbonate vapor and after about 800 hours is below the methane conversion of the catalyst of the invention.

The invention claimed is:

1. A catalyst composition for the steam reforming of methane which comprises as component a) a nickel catalyst comprising a mixed oxide of nickel, aluminum, and zirconium and as component b) a further oxygen-comprising aluminum compound selected from the group consisting of aluminum hydroxide [Al(OH)$_3$], aluminum oxide hydroxide [AlO(OH)] and aluminum oxide ($Al_2O_3$), wherein the catalyst composition is a physical mixture of the components a) and b).

2. The catalyst composition according to claim 1 comprising gamma-aluminum oxide (γ-$Al_2O_3$), delta-aluminum oxide (δ-$Al_2O_3$) or theta-aluminum oxide (θ-$Al_2O_3$) or mixtures thereof as component b).

3. The catalyst composition according to claim 1, wherein the component b) is present in an amount of from 1 to 60% by weight, based on the total amount of the catalyst composition.

4. The catalyst composition according to claim 1, wherein the components a) and b) are present as pulverulent particles.

5. The catalyst composition according to claim 4, wherein the particles of the component a) have a particle size having a $d_{50}$ of from 0.5 to 1500 μm and the particle of the component b) have a particle size having a $d_{50}$ of from 0.3 to 500 μm.

6. The catalyst composition according to claim 4, wherein the BET surface area of the component a) is in the range from 20 to 300 m$^2$/g and the BET surface area of the component b) is in the range from 20 to 400 m$^2$/g.

7. A catalyst material comprising a catalyst composition defined according to claim 1 which has been processed to form pellets or extrudates.

8. The catalyst material according to claim 7 in pellet form which consists essentially of binders, lubricants, a) a mixed oxide of nickel, aluminum and zirconium and b) gamma-aluminum oxide (γ-$Al_2O_3$), delta-aluminum oxide (δ-$Al_2O_3$) or theta-aluminum oxide (θ-$Al_2O_3$) or mixtures thereof.

9. The catalyst material according to claim 8 in the form of a pellet having a diameter in the range from 0.8 to 5 mm and a height in the range from 1 to 10 mm.

10. A process comprising producing hydrogen by a steam reforming reaction in a fuel cell in the presence of the catalyst material defined according to claim 7.

* * * * *